March 10, 1970  J. E. DREJZA ETAL  3,500,081

LOW INERTIA STEPPING MOTOR

Filed Nov. 26, 1968

INVENTORS
JOHN E. DREJZA
EUGENE T. KOZOL
ROBERT E. PELKIE
JOSEPH E. WALLACE

BY Francis V. Giolma
ATTORNEY

United States Patent Office

3,500,081
Patented Mar. 10, 1970

3,500,081
LOW INERTIA STEPPING MOTOR
John E. Drejza, Endwell, Eugene T. Kozol, Binghamton, and Robert E. Pelkie and Joseph E. Wallace, Endicott, N.Y., assignors to International Business Machines Corporation, Armonk, N.Y., a corporation of New York
Filed Nov. 26, 1968, Ser. No. 779,161
Int. Cl. H02k *37/00*
U.S. Cl. 310—49     7 Claims

ABSTRACT OF THE DISCLOSURE

In a stepping motor, a low inertia rotor is provided by mounting a pair of laminated rotor sections on a shaft in predetermined spaced apart relation, with a cylindrical permanent magnet element located therebetween and supported in stationary relation thereto by adjustable support means for centering the magnet relative to the rotor sections.

DESCRIPTION OF PRIOR ART

According to the prior art, permanent magnet stepping motor rotors are formed by mounting cup-shaped soft iron toothed rotor members on opposite sides of a cylindrical permanent magnet rotor member secured to and rotating with the shaft.

SUMMARY OF THE INVENTION

Generally stated, it is an object of this invention to provide an improved performance low inertia stepping motor.

More specifically, it is an object of the present invention to provide for supporting a permanent magnet located substantially within a laminated rotor structure, by stationary support means outside the rotor structure.

Another object of the invention is to provide a stepping motor rotor having two substantially cup-shaped portions with axial grooves about their peripheries mounted in predetermined spaced apart and opposed relation with each other on a shaft, and substantially enclosing a cylindrical permanent magnet member which is supported in spaced relation with the shaft and rotor portions by adjustable stationary support means.

Yet another object of the invention is to provide for axial adjustment of a stationary support for a cylindrical permanent magnet rotor member which is located between and substantially encased by a pair of oppositely disposed cup-shaped laminated rotor members, so as to provide for centering the permanent magnet member between the rotor members.

It is also an object of this invention to provide for locating a pair of cup-shaped rotor members in predetermined spaced relation on a shaft by a spacer therebetween which provides a predetermined distance therebetween, and to provide a predetermined air gap between each of the rotor members and the ends of a cylindrical permanent magnet surrounding the shaft and substantially encased by the rotor members, by axial adjustment of the permanent magnet by means of an axially adjustable stationary support connected to the permanent magnet.

Yet another object of the invention is to provide for supporting a cylindrical permanent magnet member between a pair of spaced apart cup-shaped rotor members facing each other on a rotatable shaft, by means of stationary support means connected to the permanent magnet member between adjacent portions of the rotor members.

It is also an object of this invention to provide for positioning a substantially cylindrical permanent magnet member in a stepping motor, loosely about a shaft between two substantially oppositely disposed cup-shaped rotor members which are pressed onto the shaft inpredetermined spaced relation so as to substantially enclose the permanent magnet member, and move the magnet member axially to the shaft by slideable stationary support means supported by the motor housing in order to adjust the air gaps between the ends of the magnet member and the rotor members.

In a preferred embodiment of the invention, the rotor for a stepping motor comprises a pair of substantially cup-shaped laminated rotor elements mounted on a shaft in spaced apart relation. A cylindrical permanent magnet surrounds the shaft, being loosely disposed thereon and located between, in spaced relation with, and substantially encased by the cup-shaped members. A spacer on the shaft separates the cup-shaped members so as to define a fixed distance between the inner walls of the cup-shaped members which is a predetermined amount greater than the length of the permanent magnet. The cylindrical magnet has a ring of non-magnetic material secured about its middle and positioned in the space between the lips of the cup-shaped members. The ring is attached to axially aligned support straps which are attached to an end ring adjustably secured to one stationary end plate of the motor stator by means of adjusting screws, by which the magnet may be adjusted axially so as to be centrally located between the rotor members and supported in stationary spaced relation with the laminated rotor members.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
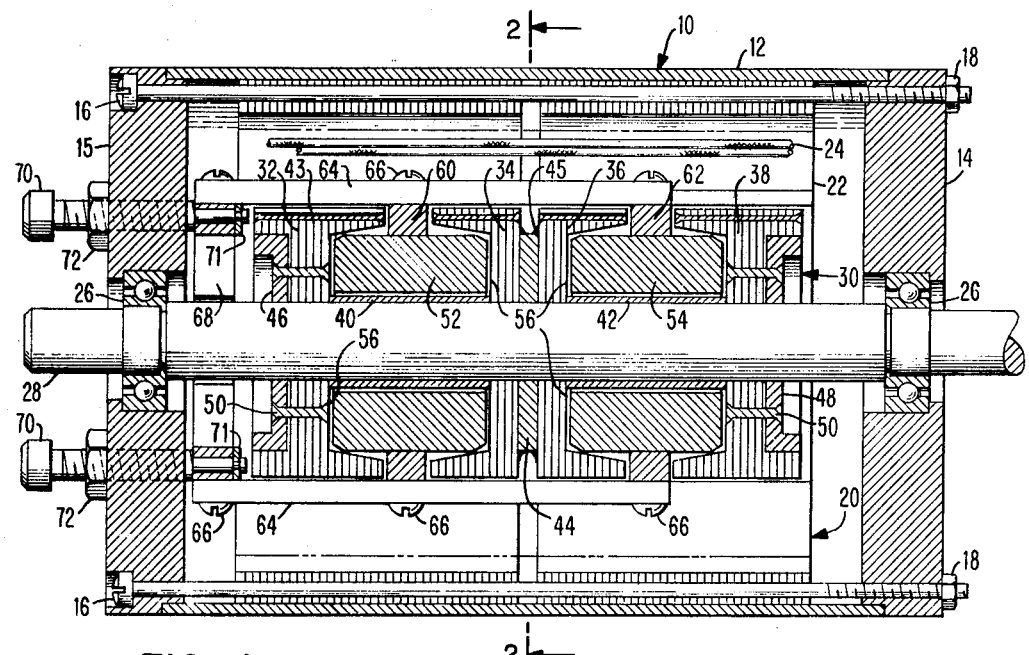
FIGURE 1 is a side elevational view in cross section of a stepping motor embodying the invention in one of its forms.
Figure 2:
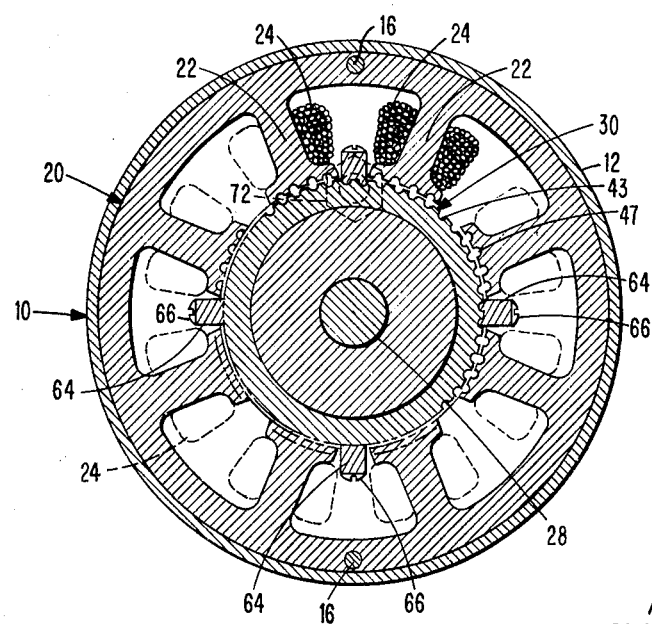
FIGURE 2 is a sectional view taken along the line 2—2 of FIGURE 1.

For purposes of description, the stepping motor 10 in FIGURES 1 and 2 of the drawings is generally of the type shown and described in detail in Paper 61–650 approved for presentation at the AIEE Northeastern District Meeting, Hartford, Conn., May 17–19, 1961 by Arthur E. Snowdon and Elmer W. Madsen, entitled "Characteristics of a Synchronous Motor." A motor of the same general type is shown and described in U.S. Patent No. 3,206,623 entitled "Electric Synchronous Inductor Motor," which issued on Sept. 14, 1965 to A. E. Snowdon.

Referring in particular to FIGURES 1 and 2 of the drawings, it will be seen that the stepping motor 10 comprises a cylindrical housing 12 having a recessed fit with circular end plates 14 and 15 secured thereto by means of axial bolts 16 provided with nuts 18. Within the housing 12 is mounted a stator structure 20 comprising a plurality of laminations defining radial pole pieces 22 which are provided with windings 24 for producing suitable magnet flux therein.

The end plates 14 and 15 are centrally recessed to receive suitable bearings 26 for rotatably supporting a motor shaft 28. The shaft carries a rotor 30 comprising similar pairs of oppositely disposed substantially cup-shaped laminated rotor members 32, 34 and 36, 38. The rotor members 32, 34, 36, 38 are disposed to be firmly pressed on the shaft 28 with the members 32, 34 separated by a tubular spacer 40 positioned therebetween on the shaft. A like spacer 42 determines the spacing of the members 36, 38. A non-magnetic disk-like spacer 44 between the members 34 and 36 separates the two sections of the rotor. The rotor members 32 and 38 are provided with cup-shaped reinforcing members 46 and 48 of a non-magnetic material such as aluminum, which may be secured to their respective rotor members by means of rivets 50. The rotor members 34 and 36 may be secured to the non-magnetic spacer 44 in order to stiffen them, being for example, cemented thereto by means of a suitable epoxy cement 45 or the like or riveted thereto if desired. The rotor members and the pole pieces are each provided with a plurality of grooves defining spaced teeth as described in the technical paper and patent hereinbefore referred to.

In order to provide a permanent magnet flux for the rotor members 32, 34, 36, 38, substantially cylindrical permanent magnet members 52 and 54 are positioned loosely about the shaft 28 between the rotor members 32, 34 and 36, 38, respectively. The permanent magnet members 52 and 54 have a clearance fit about the spacers 40 and 42, and are arranged to have a predetermined air gap 56 at each end between the permanent magnet member and the adjacent rotor member. This is obtained by making the spacers 40 and 42 a predetermined amount longer than the width of the permanent magnet members. Instead of having the permanent magnet members 52 and 54 fixed on the shaft to rotate with the rotor members 32, 34, 36 and 38, adjustable support means are provided for stationarily supporting the permanent magnet members 52 and 54 substantially within the confines of the rotor members 32, 34 and 36 and 38, yet providing for axial adjustment to provide equal air gaps on each end of the magnets. For this purpose, support rings 60 and 62 are secured to the permanent magnet members, being pressed thereon with a press fit and of such a size so as to provide a clearance fit between the adjacent lips of their respective rotor members. Support straps or bars 64 are connected to the support rings 60 and 62 by means of screws 66, the support bars being arranged to extend beyond the end of the rotor where they may be secured to an end support ring 68. The support ring 68 is secured to the end plate 15 by means of adjustable support screws 70 which are threadably mounted in the end plate 15 and provided with lock nuts 72 for securing them in a fixed position relative thereto. The support screws 70 are rotatably secured to the end ring 68, for example, having a reduced cross-sectional portion projecting through openings in the end ring and fastened thereto with a split lock washer or C type washer 71 secured in a groove on the opposite side thereof.

The rotor 30 may be assembled by first pressing the rotor member 32 thereon, followed by the spacer 40 about which the permanent magnet 52 with its support ring 60 may be loosely positioned. The rotor sections 34 and 36 may then be pressed on the shaft with the spacer 44 therebetween. Next, the spacer 42 is placed about the shaft with the permanent magnet member 54 loosely positioned thereabouts, and finally, the rotor member 38 is pressed onto the shaft. The spacers 40 and 42 maintain the rotor members 32, 34 and 36, 38 in the proper axial spaced relation. The guide bars 64 may then be secured to the support rings 60 and 62 and to the end support ring 68 which may be attached to the end plate 15 by means of the support screws 70.

With the permanent magnet members 52 and 54 in place, the complete rotor assembly may be inserted in the stator and the whole motor subjected to a strong magnetic field to insure the proper magnetization of the permanent magnet members 52 and 54. When using permanent magnet members on the order of 1⅜″ OD, by ⅝″ ID, by 1¼″ thick, of, for example, Alnico 5A which comprises 8% aluminum, 15% nickel, 24% cobalt, 3% copper and the balance iron, we have found that the maximum magnetization may be readily obtained by inserting the complete motor assembly including the rotor with the permanent magnets installed, in a coil of #24 copper wire on the order of 4⅓″ long with an inside diameter of 3⅞″, and connecting the coil to a bank of capacitors having a capacity on the order of ⅒ farad and charged to 275 volts. This provides a current pulse of adequate value to insure complete magnetization of the magnets utilizing the motor stator as a keeper. By first adjusting the support screws 70 so as to move the permanent magnets in one direction until they engage the adjacent faces of the rotor members and then backing the support screws off until they engage the adjacent faces of the oppositely disposed rotor member, the permanent magnets may be readily adjusted to an intermediate position in which both air gaps are substantially equal. By making the spacers 40 and 42 each approximately .004 inch longer than the permanent magnets 52 and 54, .002 inch air gaps may be provided on each end of the magnets between the magnets and the adjacent faces of the rotor members. With a stepping motor having a double rotor with an outside diameter of approximately 1¾″ and an overall length of 3½″, this air gap has proved satisfactory. The support rings and support bars as well as the spacers and reinforcing members are preferably of non-magnetic material, aluminum or aluminum alloys, having been used with satisfactory results.

For a given motor, the acceleration factor $T/J_r$, where $T$ is torque and $J_r$ is the rotor inertia, can be of course increased by reducing $J_r$ by means of this concept. Since the permanent magnet members are now stationary, they will not affect the inertia of the rotor. The important factor in the above-described arrangement is, that a reduction in torque caused by the additional reluctance path of the air gaps introduced, is less in percentage than the reduction in $J_r$, resulting in an increase in acceleration over the normal rotating magnet type motor. The above-described construction permits easy adjustment of the air gaps for the maximum performance characteristics.

While the invention has been particularly shown and described with reference to a preferred embodiment thereof, it will be understood by those skilled in the art that various changes in form and details may be made therein without departing from the spirit and scope of the invention.

What is claimed is:

1. An electric motor of the synchronous inductor type comprising a rotor and a stator having an annular pole forming member with winding means magnetically coupled to the pole forming members and adapted to be energized to magnetize said pole forming members wherein the improvement comprises, the rotor having a shaft with a pair of cup-shaped rotor members disposed on the shaft in predetermined spaced relation with the open ends facing each other, and an annular permanent magnet member loosely positioned about the shaft between and substantially encased by the rotor members, said permanent magnet member having support means extending from between the rotor members and connected to the stator to support the permanent magnet in stationary spaced relation with the rotor members.

2. The invention as defined in claim 1 characterized by means on the shaft spacing the rotor members in predetermined spaced relation.

3. The invention as defined in claim 2 characterized by the support means for the permanent magnet having an adjustable connection with the stator.

4. The invention as defined in claim 3 characterized by the spacing means on the shaft comprising a sleeve having a length equal to the axial length of the permanent magnet plus twice the desired air gap between the magnet and rotor members.

5. The invention as defined in claim 4 characterized by the support means for the permanent magnet having a ring secured thereto in the gap between the adjacent lips of the rotor members.

6. The invention as defined in claim 5 characterized by the permanent magnet support rings being secured to axial guide members fitting between the pole pieces.

7. The invention as defined in claim 6 characterized by the guide member being connected to the end plate of the stator by adjustable screw means.

References Cited

UNITED STATES PATENTS

| | | | |
|---|---|---|---|
| 1,110,029 | 9/1914 | Alexanderson | 310—191 |
| 3,206,623 | 9/1965 | Snowdon | 310—162 |
| 3,243,459 | 12/1966 | Kreuter | 310—49 |
| 3,293,460 | 12/1966 | Iwai | 310—49 |
| 3,343,014 | 9/1967 | Giles | 310—49 |

MILTON O. HIRSHFIELD, Primary Examiner

R. SKUDY, Assistant Examiner

U.S. Cl. X.R.

310—159, 209